(12) United States Patent
Cabaj et al.

(10) Patent No.: US 10,641,311 B2
(45) Date of Patent: *May 5, 2020

(54) ANCHOR FASTENER INCLUDING AN EXPANSION SLEEVE

(71) Applicant: Illinois Tool Works Inc., Glenview, IL (US)

(72) Inventors: Stanley J. Cabaj, Park Ridge, IL (US); Yongping Gong, Wilmette, IL (US)

(73) Assignee: Illinois Tool Works Inc., Glenview, IL (US)

( * ) Notice: Subject to any disclaimer, the term of this patent is extended or adjusted under 35 U.S.C. 154(b) by 273 days.

This patent is subject to a terminal disclaimer.

(21) Appl. No.: 15/400,603

(22) Filed: Jan. 6, 2017

(65) Prior Publication Data

US 2017/0114818 A1    Apr. 27, 2017

Related U.S. Application Data

(63) Continuation of application No. 14/505,716, filed on Oct. 3, 2014, now Pat. No. 9,541,116.

(51) Int. Cl.
*F16B 13/06* (2006.01)
*F16B 29/00* (2006.01)

(52) U.S. Cl.
CPC ........... *F16B 29/00* (2013.01); *F16B 13/065* (2013.01)

(58) Field of Classification Search
CPC .............................. F16B 13/065; F16B 13/066
USPC .................................................... 411/71–74
See application file for complete search history.

(56) References Cited

U.S. PATENT DOCUMENTS

| | | | |
|---|---|---|---|
| 925,006 A | 6/1909 | Mason | |
| 1,000,715 A | 8/1911 | Caywood | |
| 1,065,747 A | 6/1913 | Tuck | |
| 1,115,205 A | 10/1914 | Johnson | |
| 1,121,980 A * | 12/1914 | Conrad | F16B 13/066 411/53 |
| 1,164,322 A | 12/1915 | Yeatman | |

(Continued)

FOREIGN PATENT DOCUMENTS

DE    10 2014 103 717 A1 *  10/2014

OTHER PUBLICATIONS

"Concrete Anchor Bolts for Pedestrian Barrier" web page by Global Industrial printed Jun. 30, 2104.

(Continued)

*Primary Examiner* — Flemming Saether

(74) *Attorney, Agent, or Firm* — Neal, Gerber & Eisenberg LLP

(57) ABSTRACT

A fastener including a body having a threaded portion and an opposing, tapered portion, where the tapered portion includes an outwardly angled surface, and a sleeve movably connected to the body. The sleeve includes a plurality of fingers at least partially separated from each other, where each of the fingers includes at least two, axially spaced gripping members protruding from the body. When the fastener is inserted in a borehole formed in a substrate and a fastening member is threaded onto the threaded portion and tightened, the sleeve progressively moves along the angled surface causing the fingers to move outwardly and at least one of the gripping members to engage an inner surface of the substrate forming the borehole to secure the fastener in the borehole.

23 Claims, 5 Drawing Sheets

(56) References Cited

U.S. PATENT DOCUMENTS

| | | | |
|---|---|---|---|
| 1,470,858 A | 10/1923 | Maxwell | |
| 3,000,254 A * | 9/1961 | Hottenstein | E21D 21/008 411/53 |
| 3,577,825 A * | 5/1971 | Reusser | F16B 13/066 411/53 |
| 4,481,702 A | 11/1984 | Mitchell | |
| 4,720,224 A | 1/1988 | Peterken | |
| 4,806,053 A * | 2/1989 | Herb | F16B 13/065 405/259.3 |
| 4,854,793 A * | 8/1989 | Ollivier | F16B 13/045 411/49 |
| 4,904,135 A | 2/1990 | Barthomeuf et al. | |
| 4,917,552 A * | 4/1990 | Crawford | F16B 13/126 411/32 |
| 4,929,134 A | 5/1990 | Bergner | |
| 5,314,278 A * | 5/1994 | Weber | F16B 13/065 411/55 |
| 5,419,664 A | 5/1995 | Hengesbach | |
| 5,690,455 A | 11/1997 | Fischer et al. | |
| 5,911,550 A | 6/1999 | Popp et al. | |
| 6,270,303 B1 | 8/2001 | Gauthier et al. | |
| 6,524,046 B2 * | 2/2003 | Hsu | F16B 13/065 411/51 |
| 6,827,535 B2 | 12/2004 | Fuchs | |
| 6,829,871 B1 | 12/2004 | McSherry et al. | |
| 7,587,873 B2 | 9/2009 | McSherry et al. | |
| 7,682,116 B2 * | 3/2010 | Cabrele | F16B 13/001 411/451.1 |
| 7,744,320 B2 | 6/2010 | Kobetsky et al. | |
| 7,811,037 B2 | 10/2010 | Kobetsky et al. | |
| 7,959,379 B2 * | 6/2011 | Robertson, Jr. | E21D 21/008 405/259.1 |
| 8,251,625 B2 | 8/2012 | Zimmer et al. | |
| 8,287,218 B2 | 10/2012 | Zimmer et al. | |
| 8,302,276 B2 | 11/2012 | Kobetsky et al. | |
| 8,491,244 B2 | 7/2013 | Kobetsky et al. | |
| 8,974,163 B2 | 3/2015 | Ricketts | |
| 2004/0096288 A1 | 5/2004 | Haug | |
| 2010/0272536 A1 | 10/2010 | Kaplan et al. | |
| 2012/0263553 A1 | 10/2012 | Greenfield | |
| 2014/0072384 A1 | 3/2014 | Wissling | |

OTHER PUBLICATIONS

"Dock Bumper Installation Bolt" web page by Global Industrial printed Jun. 30, 2104.

International Search Report and Written Opinion for International Application No. PCT/US2015/052851, dated Dec. 11, 2015 (12 pages).

"Trubolt+ Seismic Wedge" brochure by Red Head Concrete Anchoring dated Feb. 2012.

"Wedge Anchors" web page by Concrete Fastening Systems printed Jun. 30, 2104.

New Zealand First Examination Report for New Zealand Application No. 729083, dated Oct. 2, 2017 (5 pages).

* cited by examiner

ANCHOR FASTENER INCLUDING AN EXPANSION SLEEVE

PRIORITY CLAIM

This patent application is a continuation of, and claims priority to and the benefit of, U.S. patent application Ser. No. 14/505,716, which was filed on Oct. 3, 2014, the entire contents of which are incorporated herein by reference.

BACKGROUND

The present disclosure relates generally to fasteners, and more specifically to anchor fasteners for securing structures, sub-structures and construction joints to a cement foundation or substrate.

Fasteners are used in construction to secure structures, such as frames and joints, to various types of supports such as wood or metal studs. Fasteners are also used to secure structures to cement or concrete substrates or the like. One type of fastener used to secure such structures to cement or concrete is an anchor assembly such as an anchor bolt. Examples of such anchor assemblies are disclosed in U.S. Pat. Nos. 1,000,715; 1,115,205; 4,720,224; 4,904,135; 4,929,134; and 5,911,550. Anchor assemblies, such as anchor bolts, must meet certain performance standards and capabilities developed by cracked concrete testing procedures described in U.S. Pat. Nos. 7,744,320; 7,811,037; 8,302,276; and 8,491,244, which are incorporated herein by reference. In particular, it is important for anchor assemblies to resist failure under designated loads and exhibit high pull-out resistance and long service lives. Additionally, anchor assemblies must securely and reliably affix structures to cement substrates, structures and substructures.

Accordingly, there is a need to improve the failure resistance, pull-out resistance and service lives of anchor assemblies for securely affixing structures to cement substrates, structures and substructures.

SUMMARY

The foregoing and other objectives are achieved in accordance with the presently described teachings and principles through the provision of an anchor fastener including an expansion sleeve.

In an embodiment, a fastener is provided that includes a body having a threaded portion and an opposing, tapered portion, where the tapered portion includes an outwardly angled surface, and a sleeve movably connected to the body. The sleeve includes a plurality of fingers at least partially separated from each other, where each of the fingers includes at least two, axially spaced gripping members protruding from the body. When the fastener is inserted in a borehole formed in a substrate and a fastening member is threaded onto the threaded portion and tightened, the sleeve progressively moves along the angled surface, causing the fingers to move or flare outwardly and at least one of the gripping members to engage an inner surface of the substrate forming the borehole to secure the fastener in the borehole.

In another embodiment, a fastener is provided that includes an integral body having a threaded portion, an opposing, tapered portion and an outwardly extending lip, where the tapered portion includes an outwardly angled surface. A clip is slidably connected to the body between the tapered portion and the lip, the clip including a plurality of at least partially separated fingers, each of the fingers including at least three, axially spaced gripping members protruding from the body, where at least two of the gripping members are radially offset from each other. Furthermore, each of the gripping members projects a radial distance from the body where the radial distance of each of the gripping members progressively increases from the tapered portion to the threaded portion of the clip. When the fastener is inserted in a borehole formed in a substrate and a fastening member is threaded onto the threaded portion and tightened, the clip progressively moves along the angled surface causing the fingers to move outwardly, and at least two of the gripping members to sequentially engage an inner surface of the substrate forming the borehole to secure the fastener in the borehole.

DETAILED DESCRIPTION

The present disclosure relates generally to fasteners for securing structures, substructures, a frame or other building structures to a substrate, and more specifically, to anchor fasteners for securing such structures to a cement substrate.

Figure 1:
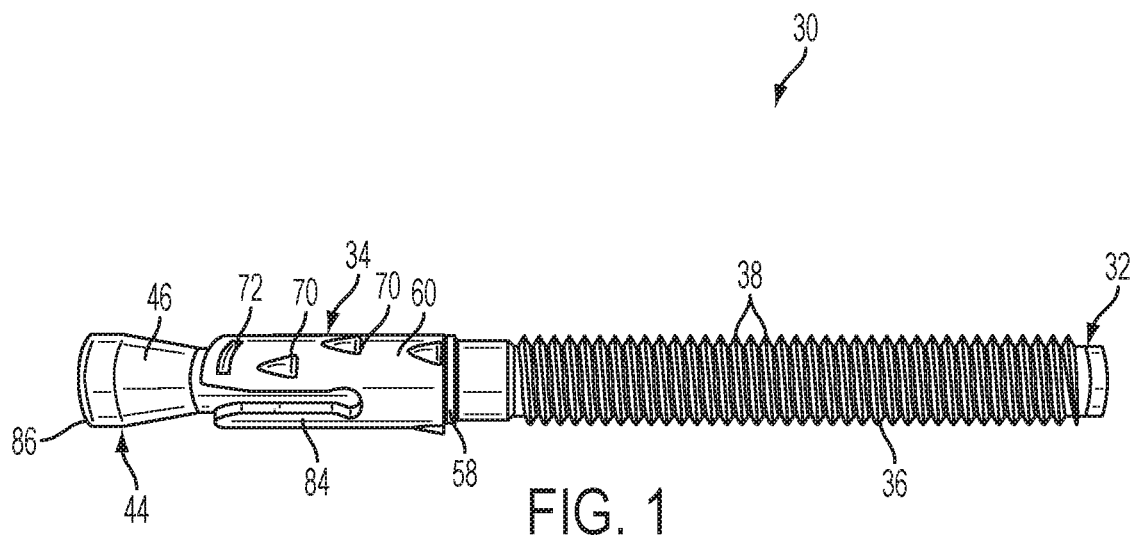
FIG. 1 is a perspective view of the present anchor bolt.
Figure 2:
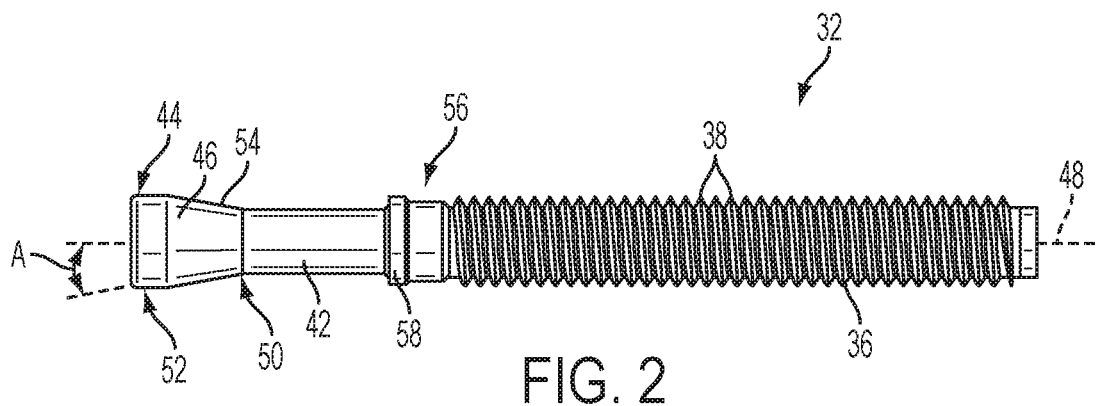
FIG. 2 is a fragmentary side view of the anchor bolt of FIG. 1.
Figure 3:
FIG. 3 is an end view of a first end of the anchor bolt of FIG. 1.
Figure 4:
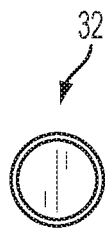
FIG. 4 is an end view of a second, opposing end of the anchor bolt of FIG. 1.
Figure 5:
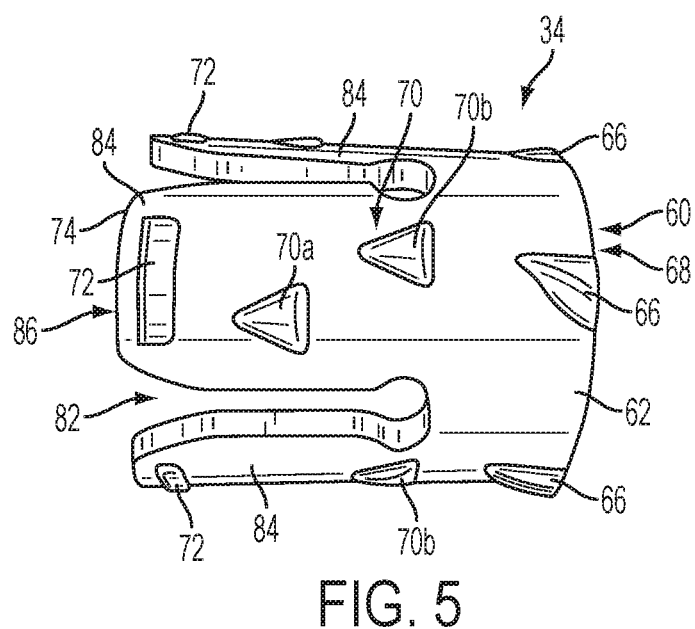
FIG. 5 is a side perspective view of an embodiment of the clip on the anchor bolt of FIG. 1.

Referring to FIGS. 1-11, an example of an anchor fastener of the present disclosure is illustrated where the anchor fastener is an anchor bolt generally designated 30. The anchor bolt 30 includes an integrally formed body 32 and an expansion sleeve or clip 34 that is movably connected to at least a portion of the body. The body 32 is formed to a designated length and diameter, which may be any suitable length or diameter. As shown in FIG. 2, the body 32 includes a threaded portion 36 having a series of threads 38 that are configured to matingly engage a fastening member, such as hex nut 40 (FIG. 12A), or other suitable fastener, a generally cylindrical mandrel portion 42 (FIG. 2) and a tapered portion or wedge portion 44. The tapered portion 44 has an angled head 46 that extends outwardly at a designated angle "A" relative to a longitudinal axis 48 extending through the center of body 32, where the designated angle is preferably 9.5° to 10.5°. It should be appreciated that the angle "A" of the tapered portion may be any suitable angle.

Generally, the angled head 46 has a first diameter 50, which is the outer diameter of the mandrel portion 42, and a second diameter 52, which is the largest outer diameter of the angled head 46, and an angled surface 54 that extends from the portion having the first diameter 50 to the portion having the second diameter 52. In the illustrated embodiment, the angled surface 54 is at an angle of 10° relative to the longitudinal axis of the body but may be any suitable angle. The body 32 also includes a cylindrical collar 56 that is embossed or otherwise formed on the body between the mandrel portion 42 and the threaded portion 36.

As shown in FIG. 2, the collar 56 has a lip 58 that radially extends from the body 32. The lip 58 helps to prevent the clip 34 from falling off of or separating from the body 32 as the anchor fastener 30 is inserted in a borehole. As stated above, the body 32 is integrally formed and made with a metal such as stainless steel, galvanized steel or other suitable material or combination of materials.

Figure 6:
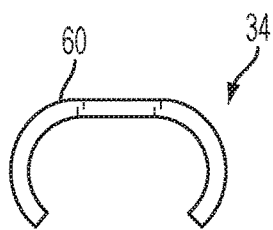
FIG. 6 is a top view of the clip of FIG. 5.

Referring now to FIGS. 5-11, the clip 34 has an integrally formed body 60 made of a metal, such as stainless steel or galvanized steel, and is initially formed as a flat, rectangular plate 62 that is at least partially curved or bent around the body 32 (see FIGS. 1 and 6). A bottom, inside surface 63 of the plate (FIG. 10) is formed at an angle (preferably 9.5° to 10.5°) that matches the angle "A" of the tapered portion 44 to facilitate movement of the clip along the surface of the tapered portion. A front surface or outer surface 64 of the plate 62 includes three angular, spaced embossments or nibs 66 at a top edge 68 of the plate, a plurality of gripping members, such as triangular embossments 70, and plurality of lower securing members, such as rectangular embossments 72, at the bottom end or bottom edge 74 of the plate.

In the example embodiment, the three angular nibs 66 at the top edge 68 of the plate 62 are spaced equally apart at a designated distance from each other and have a generally first, straight side 76 and an angled side 78. The angled side 78 forms an angle of 20° relative to the longitudinal axis of the body 60, but may be any suitable angle. Further, the angles of the angled sides 78 of the barbs 66 may be the same angle or different angles. In use, the angular barbs 66 extend into an adjacent surface, such as an inner surface of a cement substrate forming a borehole, to grip the inner surface to help prevent the anchor bolt from sliding out of the borehole and to help prevent rotational movement of the clip 34 during rotation of the fastening member, i.e., hex nut 40.

The rectangular embossments 72 at the bottom edge 74 of the clip 34 also engage the inner surface of the substrate and help maintain the clip at a designated position relative to the inner surface. Otherwise, the clip 34 could move prior to the anchor bolt 30 being tightened in the borehole and affect the load strength and stability of the bolt. In the illustrated embodiment, the lower securing members or lower embossments 72 have a rectangular shape but may be any suitable shape or size. Further, the plate 62 optionally includes one or a plurality of the lower securing members that are offset or aligned with each other.

Figure 7:
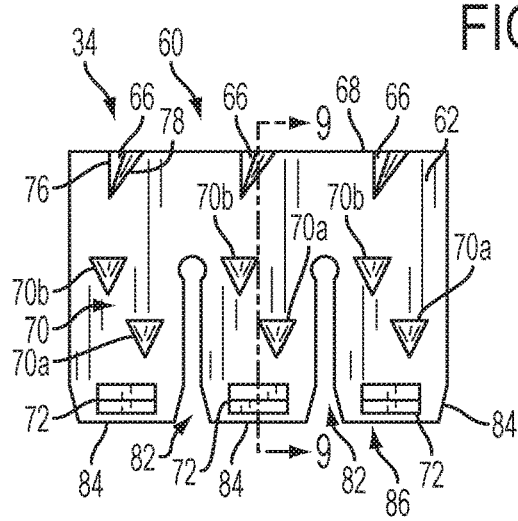
FIG. 7 is a front side view of the clip of FIG. 5.
Figure 8:
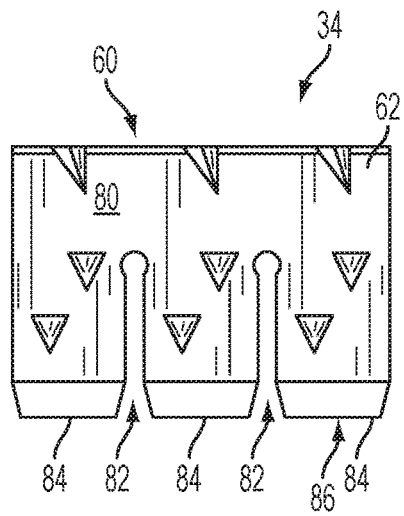
FIG. 8 is a rear side view of the clip of FIG. 5.
Figure 9:
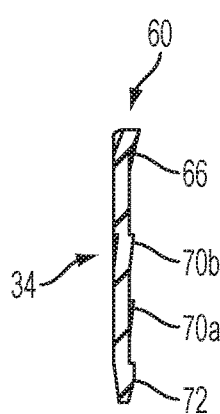
FIG. 9 is a cross-section of the clip taken substantially along line 9-9 in FIG. 7 and in the direction generally indicated.

Each embossment 70 in the three pairs of embossments has a generally triangular shape, with the point of each triangular embossment facing or extending toward the bottom end of tapered portion 44 of the body 32. Further, the embossments 70 each have an angled surface 71 (FIG. 10) forming an angle with the longitudinal axis of the body 32 where the angles of the embossments 70 may be the same angle or different angles. In the embodiment shown in FIG. 7, the bottommost embossment 71 extends a radial distance of 0.014 inches from the body 32 and is at an 8° angle relative to the longitudinal axis of the body, and the topmost embossment 71 extends a radial distance of 0.018 inches from the body and is at an 10° angle relative to the longitudinal axis. It should be appreciated that the embossments 71 may extend at any suitable radial distance or at any suitable angle relative to the body or longitudinal axis. Further, as shown in FIG. 7, each of the triangular embossments 70 are axially spaced and offset from each other. Offsetting the embossments 70 enables each embossment to contact and be at least partially embedded in independent sections of the surrounding cement forming the inner surface of the borehole without encountering any grooves, channels or other deformations formed in the inner surface by other embossments, which occurs with conventional anchor bolts. Thus, each embossment 70 independently contacts and grips the inner surface of the borehole to secure the clip 34, and thereby the anchor bolt 30, in the borehole. It should be appreciated that the three pairs of embossments 70 may be any size or shape. Also, the embossments 70 in each of the pairs of embossments may have the same shape or different shapes.

Figure 10:
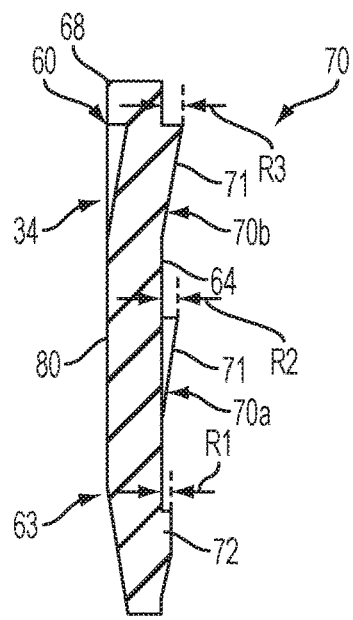
FIG. 10 is an enlarged cross-section view of a lower portion of the clip of FIG. 5.
Figure 11:
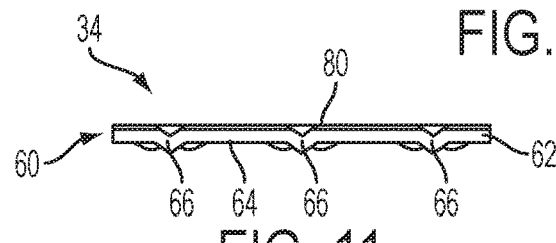
FIG. 11 is a top view of the clip of FIG. 5.

As shown in FIG. 10, each rectangular embossment 72 extends a first radial distance "R1" from the body 32 and the next embossment 70a (the lower embossment in the pair of embossments) extends a second radial distance "R2" from the body 32 where the second radial distance is greater than the first radial distance. Similarly, the topmost embossment 70b (the embossment closest to the threaded portion 36 of the body 32) extends a third radial distance "R3" from the body 32 which is greater than the second radial distance "R2." Thus, the radial distances of each of the embossments 72, 70a and 70b from the body 32 progressively increases from the tapered portion 44 to the threaded portion 36. Configuring the embossments 72, 70a and 70b to progressively extend a greater radial distance from the body 32 enables each of the embossments to contact and securely grip the inner surface of the borehole, thereby having multiple, distinct gripping points on the inner surface to securely hold the clip 34, as well as the anchor bolt 30, in the borehole. It should be appreciated that each of the embossments 70a, 70b and 72 may extend the same radial distance or different radial distances from the body 32 as shown in the illustrated embodiment.

The rear side 80 of the plate 62 is generally flat so that the clip 34 is able to move along the body 32, and more specifically, the mandrel portion 42 of the body. As shown in FIG. 7, the plate 62 includes two elongated slots or gaps 82 that divide the body 32 into three at least partially separated fingers 84 having generally the same size and shape. Each of the fingers 84 includes one of the pairs of offset triangular embossments 70. It should be appreciated that each of the fingers 84 may have one or a plurality of the embossments 70 for gripping an inner surface of a borehole or other surface. Having the separated fingers 84 enables each finger to independently move and contact the inner first surface of the borehole, thereby enabling the clip 34 to securely grip uneven surfaces or surfaces having deformities or other irregularities. It should be appreciated that the clip 34 may have two or more fingers 84 depending on the size and shape of the clip.

Figures 12A, 12B, 12C:
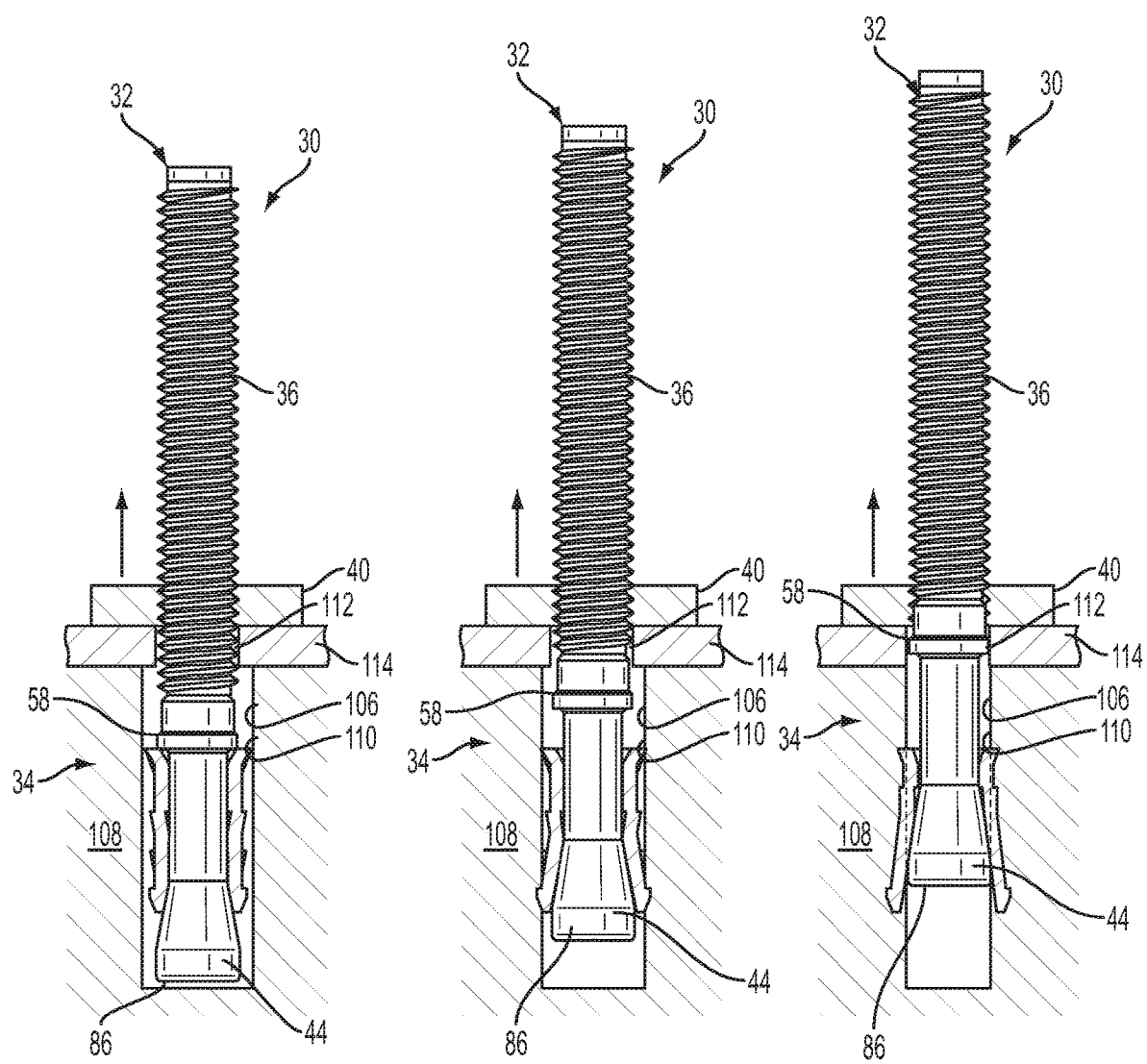
FIGS. 12A, 12B and 12C are each fragmentary, partial cross-sections of the anchor bolt of FIG. 1 showing the clip in different positions relative to the body of the anchor bolt as a fastening member is tightened on the threaded portion of the body.
Figure 13:
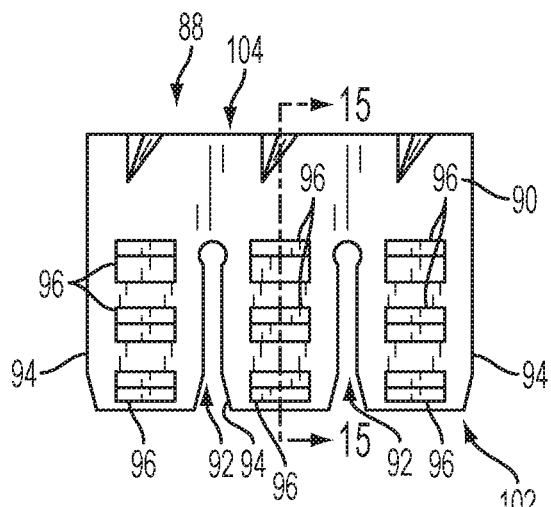
FIG. 13 is a front view of another embodiment of the clip.
Figure 14:
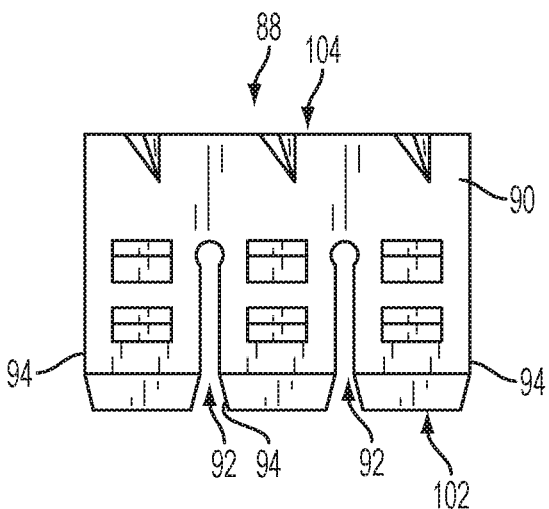
FIG. 14 is a rear view of the clip of FIG. 13.
Figure 15:
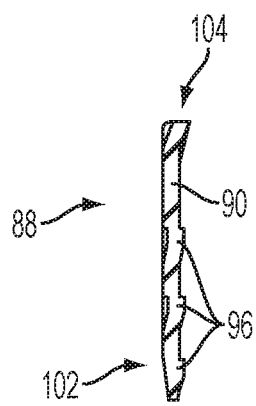
FIG. 15 is a cross-section view of the clip taken substantially along the line 15-15 in FIG. 13 and in the direction generally indicated.
Figure 16:
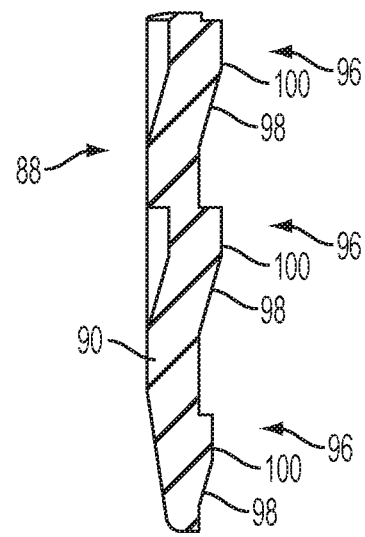
FIG. 16 is an enlarged cross-section of a lower portion of the clip of FIG. 15.
Figure 17:
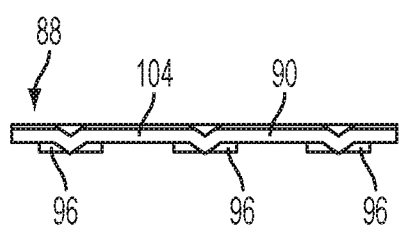
FIG. 17 is a top view of the clip of FIG. 13.

Referring now to FIG. 12A, the anchor bolt 30 is initially inserted into a borehole 106 formed in a cement substrate 108 where the inner diameter of the borehole is approximately equal to the outermost diameter of the tapered portion 44 of the body 32. The tolerance between the inner diameter of the borehole and the outermost diameter of the tapered portion 44 is configured so that the bottom end 86 of the body 32 forms a friction fit with the inner surface 110 of the borehole 106. Typically, a hammer or similar tool is used to pound the anchor bolt 30 into the borehole 106 until the bottom end 86 of the tapered portion 44 contacts the bottom end of the borehole. After one or more anchor bolts 30 are inserted in corresponding borehole(s) 112, a structure 114 such as a wood or steel frame, having corresponding holes is placed over the anchor bolt or anchor bolts so that at least the threaded portion 36 of each anchor bolt 30 extends through the boreholes 112 in the structure 114. Next, one or more washers 41 are placed over the threaded portion 36 and a fastener, such as a hex nut 40 or other suitable fastener, is threaded onto the threaded portion 36 of the body 32 and rotated relative to the body to tighten the fastener and the washer onto the structure and secure it in place. Initially as shown in FIG. 12A, the clip 34 is in a first or initial position generally abutting the lip 58 of the collar 56. It should be appreciated that the fastener, i.e., hex nut 40, can be threaded onto the threaded portion 36 without the washer 41.

Referring to FIG. 12B, as the hex nut 40 is tightened against the washer 41 and the structure 114, the body 32 moves upwardly relative to the clip 34, simultaneously causing the tapered portion 44 to move upwardly within the clip. As the tapered portion 44 moves upwardly through the clip 34, each of the fingers 84 moves outwardly due to the engagement of the angled surface 54 against the inner surface of the fingers. The outward movement of the fingers 84 causes the first embossment, i.e., the bottom rectangular embossment 72, to engage an inner surface 110 of the borehole 106 to initially secure the anchor bolt 30 in position.

As shown in FIG. 12C, as the hex nut 40 is further tightened on the threaded portion 36 of the body 32, the body 32 moves further upwardly relative to the clip 34, thereby further pushing the fingers 84 of the clip outwardly from the body 32 to sequentially cause the second and third embossments 70a and 70b to contact and engage the inner surface 110 of the borehole 106. As stated above, staggering or offsetting the second and third embossments 70a and 70b enables each of the embossments to independently engage and grip different, independent points on the inner surface 110 of the borehole 106 (without engaging any grooves or other deformities in the inner surface of the borehole) to firmly secure the anchor bolt 30 in the borehole.

Referring now to FIGS. 13-17, another embodiment of the anchor fastener includes a clip 88 including a body 90 having two slots 92 forming the three fingers 94 as described above. In this embodiment, the three fingers 94 each include three generally rectangular embossments 96 where each embossment includes an angled surface 98 and a flat surface 100. The embossments 96 on each of the fingers 94 are axially aligned with each other and each engage an inner surface of a borehole as a fastener, such as hex nut 40 shown in FIGS. 12A to 12C, is tightened onto the anchor fastener body. It should be appreciated that the clip body 90 may have any suitable number of embossments, embossments that are aligned or offset from each other and/or embossments having any suitable shape or shapes. Each of the rectangular embossments 96 extend a radial distance from the body 90 where the radial distance increases from a bottom end 102 of the clip body (closest to the tapered portion) to the top end 104 (closest to the collar). With this configuration, the embossments 96 sequentially engage a concrete surface as the hex nut 40 is tightened on the threaded portion of the anchor fastener.

While particular embodiments of an anchor fastener have been described herein, it will be appreciated by those skilled in the art that changes and modifications may be made thereto without departing from the invention in its broader aspects and as set forth in the following claims.

The invention claimed is:

1. A fastener comprising:
a fastener body; and
a sleeve slidably mounted to the fastener body, the sleeve having a longitudinal axis and including:
a plate; and
multiple fingers each having a first end and a second end,
wherein the first ends of the fingers are separated from each other, and the second ends of the fingers are connected to the plate,
wherein a first one of the fingers includes a first gripping member spaced a first axial distance from the first end of the first finger and a second gripping member spaced a second, greater axial distance from the first end of the first finger,
wherein the plate includes an angular barb having a first corner formed by the angular barb and a surface of the plate, the first corner extending aligned with the longitudinal axis of the sleeve, and a second corner formed by the angular barb and the surface of the plate, the second corner extending at an angle with respect to the longitudinal axis of the sleeve, and
wherein the first gripping member extends a first radial distance from an outer surface of the first finger and the second gripping member extends a second, greater radial distance from the outer surface of the first finger.

2. The fastener of claim 1, wherein the first gripping member includes axially spaced first and second ends.

3. The fastener of claim 2, wherein the second end of the first gripping member extends the first radial distance from the outer surface of the first finger.

4. The fastener of claim 3, wherein the first gripping member tapers radially inwardly from the second end of the first gripping member toward the first end of the first gripping member.

5. The fastener of claim 4, wherein the first gripping member is oriented such that the first gripping member tapers radially inwardly in a direction from the second end of the first finger to the first end of the first finger.

6. The fastener of claim 5, wherein the fastener body includes a threaded portion, a radially outwardly tapered portion, and a radially outwardly extending lip between the threaded and tapered portions, wherein the sleeve is slidably mounted to the fastener body between the tapered portion and the lip, wherein the tapered portion and the lip are sized to prevent the sleeve from sliding off of the fastener body.

7. The fastener of claim 1, wherein the plate is at least partially curved around the fastener body.

8. The fastener of claim 1, wherein the first gripping member and the second gripping member are circumferentially offset from one another.

9. The fastener of claim 1, wherein the fastener body includes a threaded portion having a rotational thread direction, and wherein the first and second corners of the angular barb are oriented to prevent rotation of the sleeve in the rotational thread direction.

10. An expansion sleeve for a fastener, the expansion sleeve comprising:

a first finger having a first end and a second end;
a second finger having a first end and a second end; and
a connecting member,
wherein the first ends of the first and second fingers are separated from each other, and the second ends of the first and second fingers are connected to the connecting member,
wherein the first finger includes a first gripping member spaced a first axial distance from the first end of the first finger, and a second gripping member spaced a second, greater axial distance from the first end of the first finger,
wherein the connecting member includes an angular barb having a first corner formed by the angular barb and a surface of the connecting member, the first corner extending aligned with a longitudinal axis of the expansion sleeve, and a second corner formed by the angular barb and a surface of the connecting member, the second corner extending at an angle with respect to the longitudinal axis of the expansion sleeve, and
wherein the first gripping member extends a first radial distance from an outer surface of the first finger and the second gripping member extends a second, greater radial distance from the outer surface of the first finger.

11. The expansion sleeve of claim 10, wherein the first gripping member includes axially spaced first and second ends.

12. The expansion sleeve of claim 11, wherein the second end of the first gripping member extends the first radial distance from the outer surface of the first finger.

13. The expansion sleeve of claim 12, wherein the first gripping member tapers radially inwardly from the second end of the first gripping member toward the first end of the first gripping member.

14. The expansion sleeve of claim 13, wherein the first gripping member is oriented such that the first gripping member tapers radially inwardly in a direction from the second end of the first finger to the first end of the first finger.

15. The expansion sleeve of claim 14, wherein the first gripping member is triangular.

16. The expansion sleeve of claim 10, wherein the connecting member is at least partially curved.

17. The expansion sleeve of claim 10, wherein the first gripping member and the second gripping member are circumferentially offset from one another.

18. The expansion sleeve of claim 10, wherein the expansion sleeve is mountable to a fastener including a threaded portion having a rotational thread direction, and wherein the first and second corners of the angular barb are oriented to prevent rotation of the expansion sleeve in the rotational thread direction.

19. A fastener comprising:
a fastener body including a threaded portion, an opposing tapered portion, and a radially outwardly extending lip between the threaded and tapered portions; and
a sleeve slidably mounted to the fastener body between the tapered portion and the lip, the sleeve having a longitudinal axis and including:
a plate; and
multiple fingers each having a first end and a second end,
wherein the first ends of the fingers are separated from each other and the second ends of the fingers are connected to the plate, and
wherein for each of the fingers:
that finger includes three axially spaced gripping members that extend radially outwardly from an outer surfaces of that finger,
two of the gripping members are circumferentially offset from one another, and
two of the gripping members are triangular and one of the gripping members is rectangular;
wherein the plate includes an angular barb having a first corner formed by the angular barb and a surface of the plate, the first corner extending aligned with the longitudinal axis of the sleeve, and a second corner formed by the angular barb and a surface of the plate, the second corner extending at an angle with respect to the longitudinal axis of the sleeve.

20. The fastener of claim 19, wherein for a first one of the fingers, a first one of the gripping members extends a first radial distance from the outer surface of the first finger and a second one of the gripping members extends a second, greater radial distance from the outer surface of the first finger.

21. The fastener of claim 20, wherein the first gripping member includes axially spaced first and second ends, wherein the second end of the first gripping member extends the first radial distance from the outer surface of the first finger, and wherein the first gripping member tapers radially inwardly from the second end of the first gripping member toward the first end of the first gripping member.

22. The fastener of claim 21, wherein the first gripping member is oriented such that the first gripping member tapers radially inwardly in a direction from the second end of the first finger to the first end of the first finger.

23. The fastener of claim 19, wherein the threaded portion of the fastener body includes a rotational thread direction, and wherein the first and second corners of the angular barb are oriented to prevent rotation of the sleeve in the rotational thread direction.

* * * * *